United States Patent Office 3,287,635
Patented Nov. 22, 1966

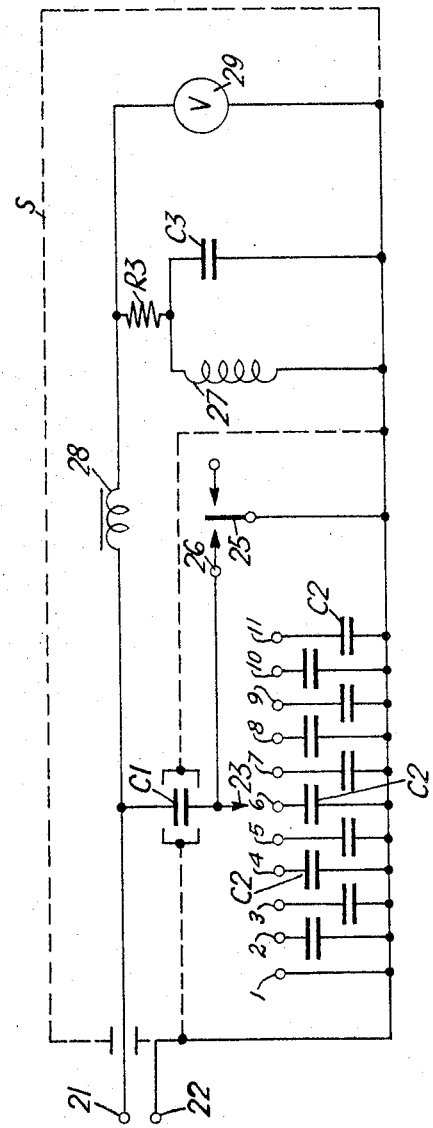

3,287,635
ELECTRICAL DISCHARGE SIMULATOR FOR INSULATION TESTING INCLUDING RELAY MEANS CONNECTED ACROSS SERIES CAPACITORS
George Mole, Leatherhead, England, assignor to E.R.A. Patents Limited, Leatherhead, England, a British company
Filed May 9, 1963, Ser. No. 279,215
Claims priority, application Great Britain, May 14, 1962, 18,464/62
3 Claims. (Cl. 324—54)

When making tests for partial discharges in electrical insulation, there is often appreciable scope for the introduction of error into the measurement of discharge magnitude. This possibility may arise because of incorrect installation of the test circuit, variability of the response characteristics of measuring equipment, indirect methods of calibration, uncertainty in the attenuation of the transmission path between the actual point of generation of the partial discharge in the insulation under test and the input terminals of the discharge detector, etc. This possibility is particularly important when a test is being made in order to determine whether the insulation of a piece of electrical equipment complies with a specification in regard to maximum partial discharge magnitude. Such tests are normally carried out by the manufacturer of the equipment in the presence of the user and the latter wishes to be satisfied that the measuring equipment is giving the correct answer.

According to the present invention a discharge simulator for insulation testing purposes has a pair of terminals for connection across insulation under test, these terminals having connected across them a pair of series-connected capacitors and the winding of an electro-magnetic relay having contacts connected to short circuit one of the capacitors when the relay is operated. When the terminals of such a simulator are connected across the insulation under test they receive during the test an alternating potential which is thus applied both to the relay winding and also to the two capacitors. During the first quarter of a cycle of the applied potential the two capacitors are charged and the voltage across the relay winding increases until at some pre-determined point the potential is sufficient to operate the relay and close the relay contacts. One of the capacitors is then short circuited and thus discharged so as to produce a sudden potential drop across the terminals. This simulates a discharge which can be measured by the measuring equipment normally employed. The magnitude of the discharge can be calculated from a knowledge of the magnitudes of the different components employed in the simulator and this can be compared with the result obtained from the measuring equipment to check the latter. Alternatively the discharge simulator can itself be calibrated using other apparatus so that the simulator then produces discharges of known magnitude.

Preferably the series-connected capacitors are connected in parallel with a circuit including a resistor connected in series with a parallel arrangement of the relay winding and a further capacitor, thus giving a phase displacement between the currents to the relay winding and to the series-connected capacitors. As a result the voltage appearing across the capacitor to be discharged immediately prior to the closing of the relay contacts can be slightly less than the peak-to-peak value of the alternating component of the voltage across this capacitor.

In order to simulate discharges of different magnitudes a number of capacitors of different capacitance may be connected to the terminals of a selector switch so that any one of these capacitors may be connected in circuit across the relay contacts so as to constitute the capacitor of the series-connected pair which is short circuited by the relay. These different capacitors may either have common relay contacts for short circuiting them or alternatively each may have its own individual pair of relay contacts.

A discharge simulator in accordance with the invention will now be described with reference to the accompanying drawing which is a schematic circuit diagram.

The terminals of the instrument are shown as 21 and 22 and are intended for connection across insulation under test to which is also applied an appropriate alternating test voltage. A capacitor C1 is connected across the terminals 21 and 22 in series with any one of a number of capacitors of different magnitude C2 which may be selected as required by means of a selector switch having stationary contacts shown as 1 to 11 and a moving contact 23. An electromagnetic relay having a moving contact 25 and a fixed contact 26 is connected so that when the relay is operated these contacts short circuit the selected one of the capacitors C2. The inclusion of screening, indicated by the dotted line S, is important for accurate results.

The relay used in this example is of the chopper type having mercury-wetted contacts. This type of contact is effectively free from bounce and therefore generates a good step-wave having a short rise time and stable magnitude. The contacts on relays of this type will close in less than 0.1 of a microsecond, not including, of course, the time of travel of the contacts before they actually meet. The winding of this relay shown as 27 is connected in parallel with a capacitor C3, this parallel arrangement being connected in series with a resistor R3 and the whole being connected in series with an inductor 28 having a low self-capacitance. By connecting the winding 27 in the manner just described the voltage appearing across the selected capacitor C2 immediately prior to the closing of the contacts 25 and 26 is slightly less than the peak-to-peak value of the alternating component of the voltage across the capacitor in question. Finally a voltmeter 29 is connected effectively across the terminals 21 and 22 to indicate the applied voltage.

In a particular construction of instrument the values of the different components, which are given purely by way of example, are as follows:

Capacitor C1—4.5 pf.

| Switch Position | Capacitor C2 | Discharge Magnitude |
|---|---|---|
| 1 | ∞ | 0. |
| 2 | 0.1 μf. | 0.1 pc. |
| 3 | 0.05 μf. | 0.2 pc. |
| 4 | 0.02 μf. | 0.5 pc. |
| 5 | 0.01 μf. | 1 pc. |
| 6 | 5000 pf. | 2 pc. |
| 7 | 2000 pf. | 5 pc. |
| 8 | 1000 pf. | 10 pc. |
| 9 | 500 pf. | 20 pc. |
| 10 | 200 pf. | 50 pc. |
| 11 | 100 pf. | 100 pc. |

Relay 27—type EBS 1607, manufactured by Elliott Brothers Limited, the winding having an inductance of 10 h. and a resistance of 7000 ohms
Inductor 28—inductance 5 h., resistance 500 ohms and self-capacitance less than 10 pf.
Resistor R3—56,000 ohms
Capacitor C3—0.1 μf.

The simulator operates at a test voltage of 200 volt R.M.S. (as indicated by the voltmeter 29) which is below the inception voltage of partial discharges normally encountered in insulation of equipment. The input capacitance of the simulator at frequencies usually employed in discharge detection (i.e., between say 10K cycles and 3M cycles per second) is of the order of 20 pf. and the simulator may therefore be employed with insulation having the lowest capacitance without appreciable reduction in the sensitivity of the test circuit being employed.

The magnitude of the partial discharge simulated by the simulator is given approximately by $$\frac{VC1^2}{C1+C2}$$

and exactly by $$\frac{V^1 C1^2}{C1+C2}$$

where V is the peak-to-peak voltage applied across the two capacitors C1 and C2 (this voltage being determined from the reading of the voltmeter) and where $V^1$ is the difference between the instantaneous voltage across the terminals when the relay contacts close and when the contacts open. In other words if $V_2$ is the voltage appearing across the capacitor C2 immediately prior to the closing of the relay contacts then $$V^1 = V_2 \left( \frac{C1+C2}{C1} \right)$$

By switching the capacitor C2 over its range of values, the range of discharge magnitude covered is from 0.1 pc. to 100 pc. The discharge magnitude is as indicated dependent upon the value of V and this is set by raising the test voltage applied to the insulation until the volmeter 29 reads 200 volts R.M.S. The exact values of the discharge magnitude are obtained by trimming the capacitor C1 during manufacture while employing other apparatus to calibrate the simulator.

I claim:
1. A discharge simulator for insulation testing purposes comprising:
   a pair of terminals affording connection across insulation to be tested;
   a pair of series connected capacitor means connected across said terminals to be charged by an A.C. potential applied to the insulation under test;
   an electromagnetic relay of the type having normally open contacts which are effectively free from bounce and which pass from the non-conducting to the conducting condition in less than 0.1 microsecond;
   phase shift means connecting the winding of said relay across said terminals;
   means connecting said contacts across one of said capacitor means so as to short-circuit and discharge said one capacitor means whenever said relay is energized to a predetermined value of said applied A.C. potential;
   and means connected across said terminals for indicating the voltage applied thereto.
2. A discharge simulator as defined by claim 1 in which said phase shift means includes a capacitor connected in parallel with the winding of said relay and a resistor connected in series with said winding and said capacitor.
3. A discharge simulator as defined by claim 1 in which one of said series connected capacitor means comprises a plurality of capacitors and a selector switch for connecting a selected one of said plurality of said capacitors in series with the other capacitor means of said pair.

References Cited by the Examiner
UNITED STATES PATENTS

| | | | |
|---|---|---|---|
| 2,436,615 | 2/1948 | Stearns | 324—54 |
| 2,558,091 | 6/1951 | Johnson | 324—54 |
| 2,594,595 | 4/1952 | Stearns | 324—54 X |
| 2,871,337 | 1/1959 | Johnson et al. | 219—113 |
| 2,901,695 | 8/1959 | Weed | 324—54 X |
| 2,956,223 | 11/1960 | Cass | 324—24 |
| 3,027,493 | 3/1962 | Smits | 320—1 X |

WALTER L. CARLSON, *Primary Examiner.*

FREDERICK M. STRADER, *Examiner.*

G. R. STRECKER, *Assistant Examiner.*